US012235813B2

(12) United States Patent
Cushman, II et al.

(10) Patent No.: US 12,235,813 B2
(45) Date of Patent: *Feb. 25, 2025

(54) SYSTEMS AND METHODS FOR CONTINUOUS DATA PROFILING

(71) Applicant: Collibra Belgium BV, Brussels (BE)

(72) Inventors: James B. Cushman, II, Longboat Key, FL (US); Vadim Vaks, Holland, PA (US); Satyender Goel, Chicago, IL (US)

(73) Assignee: Collibra Belgium BV, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,363

(22) Filed: Sep. 18, 2023

(65) Prior Publication Data

US 2024/0004849 A1 Jan. 4, 2024

Related U.S. Application Data

(63) Continuation of application No. 17/364,849, filed on Jun. 30, 2021, now Pat. No. 11,782,889.

(51) Int. Cl.
*G06F 16/215* (2019.01)
*G06F 16/22* (2019.01)
(Continued)

(52) U.S. Cl.
CPC ........ *G06F 16/215* (2019.01); *G06F 16/2282* (2019.01); *G06F 16/2457* (2019.01); *G06F 16/252* (2019.01)

(58) Field of Classification Search
None
See application file for complete search history.

(56) References Cited

U.S. PATENT DOCUMENTS 7,433,960 B1 10/2008 Dube
9,705,963 B2 7/2017 Schornack
(Continued)

FOREIGN PATENT DOCUMENTS

CN 101855647 A 10/2010
CN 108701258 A 10/2018
EP 3499360 A1 6/2019

OTHER PUBLICATIONS

International Search Report and Written Opinion of the International Searching Authority for International Application No. PCT/EP2022/068962 dated Sep. 20, 2022, 14 pages.
(Continued)

*Primary Examiner* — Kim T Nguyen
(74) *Attorney, Agent, or Firm* — Perkins Coie LLP (57) ABSTRACT

The present disclosure is directed to continuous data profiling (CDP). Entities may house large amounts of disorganized and/or duplicative data. To organize and standardize data across a data set, the data may be profiled. However, profiling large data set can be inefficient and give rise to security problems, as profiling datasets typically requires exporting a dataset to a third-party profiling runtime environment. To remedy these issues, the present disclosure is directed to a continuous data profiling platform that comprises a CDP manager communicatively coupled to a client's database. The CDP manager provides access to a CDP API that may install CDP tools on a client's native database environment, enabling the database management system to profile datasets within the client's native database environment, which results in a more efficient use of computing resources and more secure process of profiling datasets.

17 Claims, 7 Drawing Sheets

(51) Int. Cl.
*G06F 16/2457* (2019.01)
*G06F 16/25* (2019.01)

(56) References Cited

U.S. PATENT DOCUMENTS

| | | | |
|---|---|---|---|
| 10,089,362 B2 | 10/2018 | Cammert | |
| 10,291,637 B1 | 5/2019 | Bardenstein | |
| 11,218,499 B2 | 1/2022 | Bardenstein | |
| 11,782,889 B2 * | 10/2023 | Cushman, II | G06F 16/2457 707/722 |
| 11,921,885 B2 * | 3/2024 | Le | G06F 9/4881 |
| 2001/0014868 A1 | 8/2001 | Herz | |
| 2009/0177597 A1 | 7/2009 | Dube | |
| 2015/0254165 A1 | 9/2015 | Baril | |
| 2016/0048565 A1 * | 2/2016 | Cammert | G06F 16/24568 707/776 |
| 2019/0222601 A1 | 7/2019 | Bardenstein | |
| 2020/0230499 A1 | 7/2020 | Buser | |
| 2021/0319027 A1 * | 10/2021 | Goel | G06F 16/9035 |
| 2022/0150266 A1 | 5/2022 | Bardenstein | |
| 2023/0004539 A1 * | 1/2023 | Cushman, II | G06F 16/215 |
| 2023/0136094 A1 * | 5/2023 | Du | G06F 18/217 705/7.31 |
| 2023/0416283 A1 * | 12/2023 | Johnson | C07D 321/06 |
| 2024/0004849 A1 * | 1/2024 | Cushman, II | G06F 16/252 |
| 2024/0013878 A1 * | 1/2024 | Shi | G16H 50/70 |
| 2024/0095219 A1 * | 3/2024 | Joyce | G06F 16/211 |

OTHER PUBLICATIONS

Mehta, Chintan et al., "Indexing in MYSQL 8" In: "MYSQL8 Administrator's Guide: Effective Guide to Administering High-Performance MYSQL 8 SOLUTIONS", Feb. 15, 2018, 42 Pages.

* cited by examiner

SYSTEMS AND METHODS FOR CONTINUOUS DATA PROFILING

CROSS-REFERENCE TO RELATED APPLICATION(S)

This application is a continuation of U.S. patent application Ser. No. 17/364,849, filed Jun. 30, 2021, entitled "SYSTEMS AND METHODS FOR CONTINUOUS DATA PROFILING," which is related to U.S. patent application Ser. No. 16/844,927, titled "CONTEXT DRIVEN DATA PROFILING"; and U.S. patent application Ser. No. 17/236,823, titled "SYSTEMS AND METHODS FOR PREDICTING CORRECT OR MISSING DATA AND DATA ANOMALIES", which are hereby incorporated by reference in their entirety.

TECHNICAL FIELD

The present disclosure relates to continuous data profiling and, in particular, to performing continuous data profiling to derive insights into the data while conserving computing power.

BACKGROUND

Entities maintain large volumes of data digitally on various computing devices. For example, an organization may maintain columns of data on a series of interconnected servers. It may be generally desirable to inspect and evaluate these volumes of data to determine various insights into various characteristics of the data. However, retrieving and processing large volumes of data may be computationally resource intensive. Further, it may be generally difficult to derive a quality of data given the large amount of information included within the volumes of data.

As described previously in patent application Ser. No. 16/844,927, which is incorporated by reference in its entirety herein, a solution to this problem of obtaining insights into large quantities of data is data profiling, which is a process that may include the validation of attributes in client data, standardizing those attributes in a standardized format, and then processing the standardized attributes to derive insights from the data.

As data continues to grow, however, it becomes cumbersome to profile in an efficient manner. Presently, entities that want to profile their datasets often use specialized third-party tools, which require the export of client data from its native platform to a separate, third-party platform for profiling. This process has many problems, including inefficiency in exporting and importing large amounts of data, unpredictable security measures on the third-party platform, and excessive use of computer resources. In practice, entities first export their data out of their native database (usually by creating a copy), then importing that copy of data into the third-party profiling runtime environment, then exporting the profiled data out of the third-party runtime environment, and finally importing the profiled copy of data back into the native database environment from which the initial dataset originated. Further, because a copy of the dataset is often used in data profiling, the client usually needs to reconcile the profiled dataset that is imported back into the database with the un-profiled data that remained in the database. This is another additional step that requires time and intensive computing power.

As such, there is an increased need for systems and methods that can address the challenges of external and one-time data profiling, including profiling data in a compute-efficient manner utilizing less resources and requiring less export-import operations, which would further increase the security of the data, as the data less mobile.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods for continuous data profiling. Many entities (e.g., companies, organizations) maintain large volumes of data. This data can be stored in various registries or databases in computing devices. In many cases, these entities may need to identify and match records across disparate data sets as well as gain insights into the data sets. For example, an organization, in view of multiple similar data sets, may attempt to identify and select high quality and accurate datasets among the similar data sets.

The present embodiments relate to the continuous processing and profiling of data and generating insights into the ingested data. A continuous data profiling process can include validation of an attribute of the client data, standardizing the attribute into a standardized format, and processing the data via one or more rules engines. Other information, such as a usage rank or a value score, can be generated based on obtained input information.

The data profiling process can allow for insights into the data to be generated that increases data quality. An example of an insight can include duplicate or multiple instances of data attributes within a domain and across domains, including a percentage overlap. As a further example, an insight can include a data quality report from normalization and standardization (what percent is standard versus non-standard) or trends based on label processing (e.g., records with the same home address).

As described previously, current systems and methods of data profiling typically require entities to export their datasets out of their native runtime environments and into a dedicated, third-party profiling runtime environment. This process is both insecure and inefficient from a computing resources standpoint. To remedy these problems, the present systems and methods disclose an efficient continuous data profiling process, in which an entity's datasets can be profiled natively within the database in which it is stored. This is facilitated via a continuous data profiling (CDP) manager, which is a lightweight frontend application, that communicates directly to a database management system (e.g., a software application that is natively coupled to the database in which an entity's dataset is stored). The CDP manager can be in the form of an application programming interface (API), where the CDP installs certain profiling logic directly into the database management system, allowing the database management system to handle all of the profiling (e.g., tracking, scheduling, computation, and storage of profiled data). As a further example, the CDP manager can allow the database management system to generate and store statistics tables, change-data-capture (CDC) tables, profiling procedures, and profiling triggers.

Accordingly, the present disclosure provides a plurality of technical benefits including but not limited to enabling more efficient use of computer resources because entities no longer need to export and import their data out of their native database systems into third-party profiling systems. Rather, the systems and methods disclosed herein enable entities to simply call a CDP API that communicates directly with the entity's native database management systems, utilizing the entity's database compute resources for the profiling processes. Another technical benefit is the increased security of the entity's data. By avoiding the continuous export-import process into unknown and unpredictable third-party runtime environments, risks of security breaches or exposure of personally identifiable information is decreased significantly because the entity's data is not transported out of its native runtime environment before the profiling, during the profiling, and after the profiling. The data remains in a single, secure location. In short, a continuous data profiling process provides for more efficient use of computer resources and processing power and also provides for heightened security and protection of sensitive data.

Figure 1:
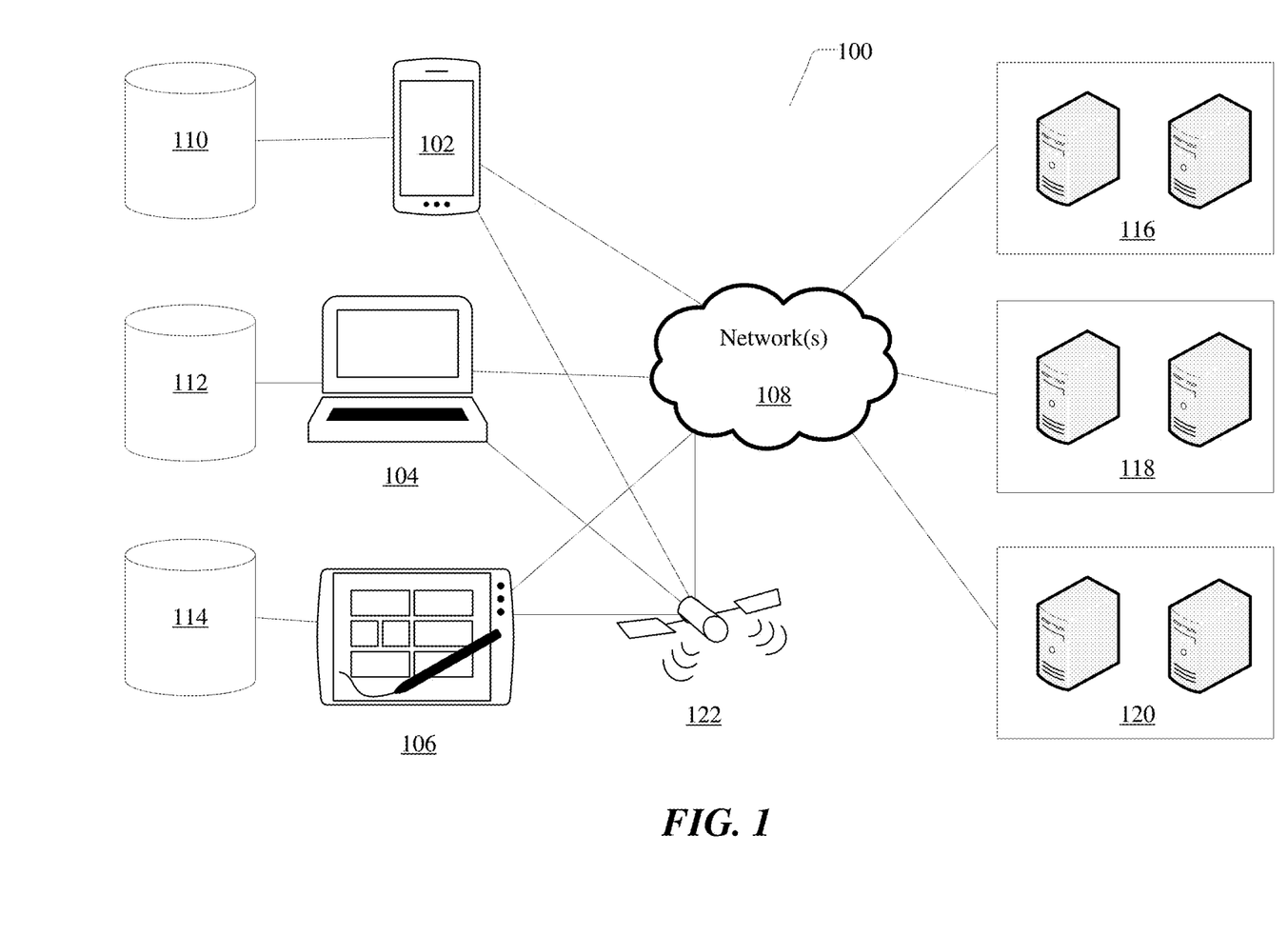
FIG. 1 illustrates an example of a distributed system for continuous data profiling, as described herein.

FIG. 1 illustrates an example of a distributed system for continuous data profiling, as described herein. Example system 100 presented is a combination of interdependent components that interact to form an integrated whole for consolidating and enriching data on a data marketplace. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data with client-specific data terminology and labels. Client devices may download a CDP manager program via network(s) 108 that may be communicatively coupled to database(s) 110, 112, and/or 114, where the client data resides. In other embodiments, instead of downloading a CDP manager directly, client device(s) 102, 104, and/or 106 may simply call a CDP manager API via network(s) 108, wherein the activation of the API allows the CDP manager (which may be operating remotely on server(s) 116, 118, and/or 120) to communicate directly with and profile data stored on database(s) 110, 112, and/or 114). Because the profiling of the data occurs at the native location of the client's datasets, the client data stored on database(s) 110, 112, and/or 114 is not transmitted via network(s) 108 to be profiled remotely, e.g., on third-party server(s) 116, 118, and/or 120. The client-specific data is stored in local databases 110, 112, and 114. The original, un-profiled data is stored on the local databases 110, 112, and 114, and the profiled data (after the CDP process is run on the data) is also stored on the local database(s) 110, 112, and/or 114. Server(s) 116, 118, and/or 120 may be third-party servers owned by an administrator of the CDP manager and/or CDP API. In other examples, once the data is profiled, profiled client-specific data may be stored in remote servers (in addition to or instead of local client devices and local databases) and may be transmitted from client servers to third-party servers via network(s) 108 and/or satellite 122.

In other examples, server(s) 116, 118, and/or 120 may be owned by the client. These server(s) 116, 118, and/or 120 may be client-owned cloud servers, where client-data resides. In this example, the client-data may be transmitted from a client-owned local database 110, 112, and/or 114 to a client-owned database 116, 118, and/or 120. A CDP manager may be communicatively coupled to either the local or remote databases that are owned by the client. This communication channel between the CDP manager and the client-owned databases may be facilitated via network(s) 108 and/or satellite 122. This example is applicable to the scenario where the remote databases/servers are owned by the client, not the third-party managing the CDP manager and/or API.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying CDP management software and/or CDP API files that are necessary to be installed on the client-owned database for profiling to occur. The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

To further elaborate on the network topology, client devices 102, 104, and/or 106 (along with their corresponding local databases 110, 112, and 114) may receive CDP management files and information once the CDP manager is communicatively coupled to the local databases 110, 112, and/or 114. Note, this is also applicable to the scenario where remote database(s) 116, 118, and/or 120 are client-owned. The CDP management files may include, but are not limited to, statistical tables, CDC tables, profiling procedures, and profiling triggers. Once the profiling of a dataset is complete, the profiled data may be stored on the initial database in which the original, un-profiled data is stored.

Figure 2:
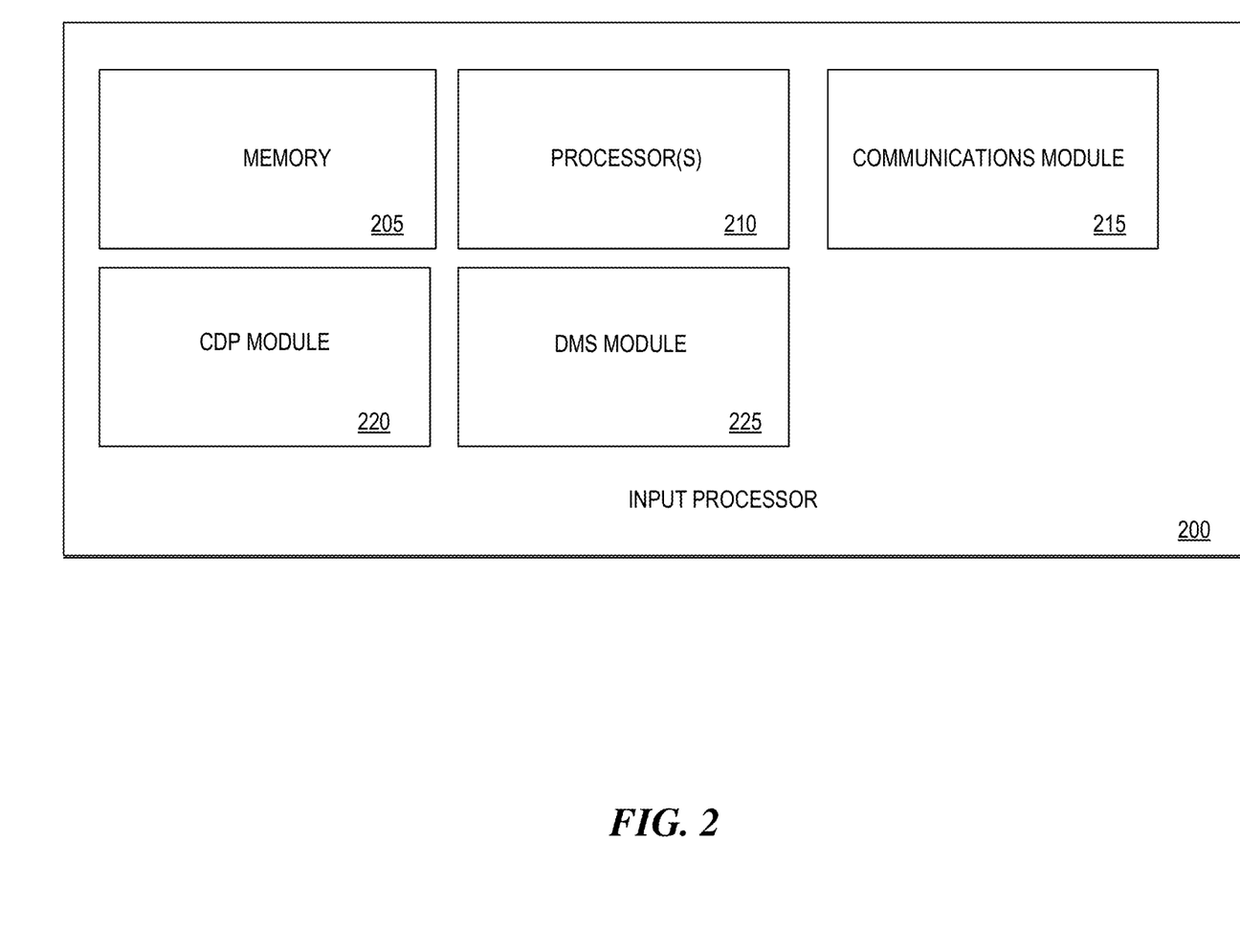
FIG. 2 illustrates an example input processor for continuous data profiling, as described herein.

FIG. 2 illustrates an example input processor for continuous data profiling, as described herein. Input processor 200 may be embedded within a client device (e.g., client devices 102, 104, and/or 106), remote web server device (e.g., devices 116, 118, and/or 120), and other devices capable of implementing systems and methods for continuous data profiling. The input processing system contains one or more data processors and is capable of executing algorithms, software routines, and/or instructions based on processing data provided by at least one client-data source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 2, the disclosed system can include memory 205, one or more processors 210, communications module 215, Continuous Data Profiling (CDP) module 220, and Database Management System (DMS) module 225. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of CDP module 220 and/or DMS module 225, as well as communications module 215. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

In some example aspects, memory 205 may store certain files from the CDP module 220 that may originate from the CDP manager, such as software applications that enable the client database(s) to generate, display, and store statistical tables, CDC tables, profiling processes, and profiling triggers. The CDP manager may also enable a user to configure any of the CDP files, which may allow for customization of the statistical and CDC tables, as well as the profiling processes and triggers. In further examples, memory 205 may store certain profiling statistics and profiled data that may be used to facilitate the profiling of data on a client database, as well as data flow between the CDP manager and the DMS.

Communications module 215 is associated with sending/receiving information (e.g., CDP applications from CDP module 220 and data (unprofiled and profiled) from the DMS module 225), commands received via client devices or server devices, other client devices, remote web servers, etc. These communications can employ any suitable type of technology, such as Bluetooth, WiFi, WiMax, cellular (e.g., single hop communication, multi-hop communication, Dedicated Short Range Communications (DSRC), or a proprietary communication protocol. In some embodiments, communications module 215 sends information output by CDP module 220 (e.g., software applications and/or logic to be installed on the DMS) and/or by DMS module 225 (e.g., profiled data, such as tracking, scheduling, computation, and storage of profiled data statistics per data table), and/or to client devices 102, 104, and/or 106, as well as memory 205 to be stored for future use. In some examples, communications modules may be constructed on the HTTP protocol through a secure REST server(s) using RESTful services. In yet further examples, the CDP module 220 may communicate with DMS module 225 via a CDP API. In other examples, external applications may request profiled data statistics, and the communications module 215 may facilitate the transmission of profiled data from the DMS module 225 to a third-party external service.

CDP module 220 is configured to install certain logic and software functionality on a database, specifically configuring the database management system that manages a client database. The logic and/or software that may be provided by CDP module 220 may include functions to facilitate the construction and storage of statistical tables, CDC tables, profiling procedures, and profiling triggers. For example, the CDP module 220 may enable the methods of change-data-capture to run on a client database via the DMS. These methods may include initiating timestamps or version numbers, table triggers (e.g., so that administrators of a database or a data table receive push notifications when data is changed), snapshots or table comparisons, and log scraping. Each of these methods allow for real-time reporting capabilities of the database status.

The CDP module 220 may also be configured with an API that allows a DMS (such as DMS module 225) to communicate with CDP module 220 and receive downloads and functions that are designed and supported by the CDP manager. Once the CDP module 220 is communicatively coupled to a local database where profiling is to be conducted, the profiling can occur continuously based on different factors. For instance, a profiling trigger could be established via the CDP module 220 that triggers profiling on new data that has been added to the dataset every 24 hours. In another example, the profiling trigger could be based on the amount of new data added to a certain dataset or data table. Once the new data amount reaches or exceeds, e.g., 10 gigabytes, the profiling process is triggered, and the new data is profiled automatically.

DMS module 225 is configured to manage at least one local database that is storing client-specific data. The DMS module 225 is configured to operate the change tracking, scheduling, computation, and storage of profile statistics per data table. The bulk of the computational resources are managed by the DMS module 225, since the CDP systems and methods described herein are using the native database resources to profile and store the data. DMS module 225 is also configured to generate and store certain timeline statistic tables that allows the DMS module 225 to capture the entire history of the profiled data. The statistic tables can be displayed via CDP module 220 based on a query received by the CDP module 220.

Figure 3:
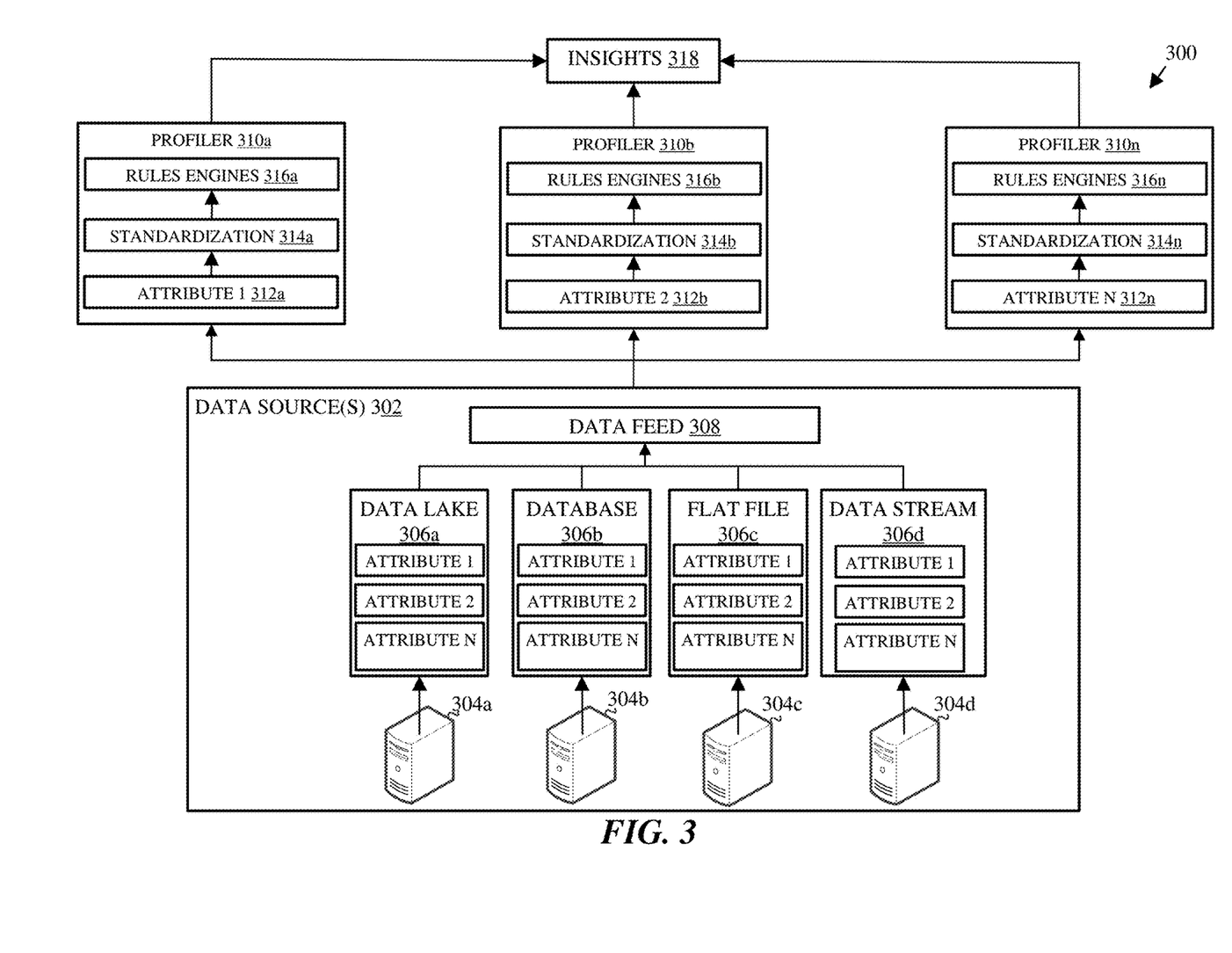
FIG. 3 illustrates an example architecture for continuous data profiling.

FIG. 3 illustrates an example architecture for continuous data profiling. A context-driven data profiling process can assist in determining a data quality of source data. Data profiling may include several processing steps that modify input information for generating insights for the data helpful in applications like optimizing matching accuracy. For example, data profiling can standardize and validate data before tokenizing profiled data.

FIG. 3 is an example architecture for continuous data profiling, showing an example profiling flow 300. A continuous data profiler can include a flexible data flow. Data can be accessed and/or processed in various batches, continuous streams, or a bulk load from a data source. As described previously, the present application is directed to the continuous data profiling streams. The data source(s) 302 can include a node (e.g., database devices 304*a-d*) configured to store/maintain data (e.g., data lake 306*a*, database 306*b*, flat file 306*c*, data stream 306*d*). For example, the data source 302 can include a single column of data, a series of relational databases with a plurality of tables of data, or data lakes with multitudes of data assets.

Data quality can be resolved in the data profiler per use case or client. For example, context can be based on a column of data, a combination of columns of data, or a data source. During a data profiling process, various data can be derived, and a summary of the data can be generated. For instance, a summary of a column of data can be identified in the form of a data sketch. The data sketch can include numeric data and/or string data. Examples of numeric data included in the data sketch can include any of a number of missing values, a mean/variance/max/min of the numeric data, an approximate quantile estimate of numeric data that can be used to generate a distribution or histogram, etc. Examples of string data can include a number of missing values, a maximum character length, minimum character length, mean char length, frequency table of labels, frequency item set, a distinct value estimate, etc.

Once any of a series of metrics are computed in a summary of the data, a data profiling score can be computed. The data profiling score can be used to determine a data quality and/or identify the best data, data composition, and targeting data quality enhancement activities. At user-set intervals, data profiling can be re-executed to recompute the metrics. These user-set intervals may be temporal (e.g., every 24 hours, new data received by data lake 306*a* is profiled) or size-based (e.g., every 1 GB of data added to flat file 306*c* is profiled). This can be used to track a history of data scores in the data lifecycle and to enable the flagging of data quality issues, in addition to efficiently using computer resources to continuously profile streams of data, rather than manual batch processing.

In some embodiments, the summary of data can include a proportion of values that follow a specific regular expression (e.g., reference data). For instance, for phone numbers that follow a particular format, the summary of data can be indicative of a number of formats that are present.

In some embodiments, the summary of data can include a number of anonymous values. For example, a known anonymous name (e.g., John Doe) can be identified in source data to determine a proportion of the data that includes anonymous values.

In other embodiments, the summary of data can include a set of data quality metrics based on a library of data quality rules. The summary of data can be utilized to enable the learning of data quality rules based on reference data associated with an attribute. The summary of data can also be utilized to enable learning of the data quality rules directly from the source data (e.g., between which values should the source data include, what should be a minimum character length).

As a first example, the source data can be inspected to derive a data quality score. The data quality score can include a score that is calculated at a column level or a record level of the source data. The data quality score can be derived from calculating any metrics included in the summary of data.

As another example, the source data can be inspected to identify quality data. For a data profiling score for each column of data in each data source, a best possible set of data can be matched to a specific client. For instance, a table can be prepared that shows a set of columns/attributes (e.g., name, address phone date of birth, email address), a data profiling score for different sources in which the column/attributes are present (CRM, ERP, order management, web). Using the data included in such a table, a set of data with a highest quality of data can be selected for a specific client. In some instances, multiple sources can be matched to receive a highest possible quality of data. This can be performed without undue processing of the source data.

As another example, the source data can be inspected to derive historical data profiling score and perform a what-if analysis. A what-if analysis can include an analysis of what would have been the case if other (certain) rules were invoked on the data. To facilitate computation of these, this can be done on sample data collected from the data summaries created during the computing the metrics stage. If the results of the what-if analysis are sufficient, a new full computation of the metrics can be performed using the new rules selected in the what-if analysis.

Data extracted from data sources (e.g., data lake 306*a*, database 306*b*, flat file 306*c*, data stream 306*d*) can be fed into profilers (e.g., profilers 310*a-n*) via a data feed 308. Data feed 308 can include a continuous feed of data to profilers. The profilers 310*a-n* may be installed on a local database via a CDP manager, which may be communicatively coupled to the database(s) 304*a-d* via a CDP module 220, as described in FIG. 2. The data fed into profilers can include attributes (e.g., attributes 312*a-n*). Attributes can be portions of data in a table, in a source, or part of the same record.

In the embodiment as shown in FIG. 3, a first profiler 310*a* can process attribute 1 312*a* and a second profiler 310*b* can process attribute 2 312*b*. Any suitable number of profilers (e.g., profiler N 310*n*) can process any number of attributes (e.g., attribute N 312*n*). Each profiler 310*a-n* can include a set of standardization rules 314*a-n* and a set of rules engines 316*a-n*. The standardization rules 314*a-n* and rules engines 316*a-n* may be installed on database(s) 304*a-n* via a CDP manager communicatively coupled to the databases, providing for the continuous profiling of the data stored on the databases and provided to the profilers 310*a-n* via data feed 308. The standardization rules 314*a-n* and/or the rules engines 316*a-n* can be modular, where each set of rules can be processed for an attribute. Each profiler can process a corresponding attribute using the corresponding set of standardization rules and the set of rules engines. In some embodiments, each profiler can implement various machine learning and/or artificial intelligence techniques and statistical tools to increase data quality in processing the attributes. The resultant data from each profiler 310*a-n* can include insights 318 indicative of various features of the attributes.

In some embodiments, data quality rules can be adjusted, which can result in different determinations to be made when executing data quality improvement tasks. For instance, a dataset might have a good score, but it was not previously known that a name of "John Doe" was an anonymous (fake or synthetic) value. By updating rules to identify that "John Doe" is an anonymous value, a change in data profiling scores and the history of the scores may be modified. This change in data profiling scores can enable identification of various data included in the dataset.

As another example, the source data can be inspected to derive automatic data quality improvement requests. A trigger can be associated with a data profiling score for a specific attribute or series of attributes. The trigger can state that if a data profiling score is below a threshold, the source data associated with the attribute can be inspected. The source data can be potentially improved if it has an identified value indicative of how the data is used in various contexts.

As another example, the source data can be inspected to derive data insights. Processing data profiling scores of source data can generate distributions of data and other insights that can be utilized in understanding features of the data before initiating another analysis of the data.

As another example, the source data can be inspected to derive smart data quality-based data selection decisioning. Based on mapping the source data to a model (e.g., a canonical model), highly correlated profiling/sampling output, correlated definitions, and/or similar endpoint consumption relationship patterns can provide recommendations for substitutes worthy of inspecting when data quality scores are superior for another dataset with similar attributes. Side-by-side comparisons can be run upon user-initiated requests to help a user identify a measure of overlap and express a relative preference. This can be stored/logged alongside user and community in order to provide recommendations calibrated with user-specific needs longer-term. For instance, a statistical table may be stored and generated via the database management system that manages data sources 302. The statistical table may be provided to a CDP manager for display upon the CDP manager receiving a query to display said statistical table.

Figure 4:
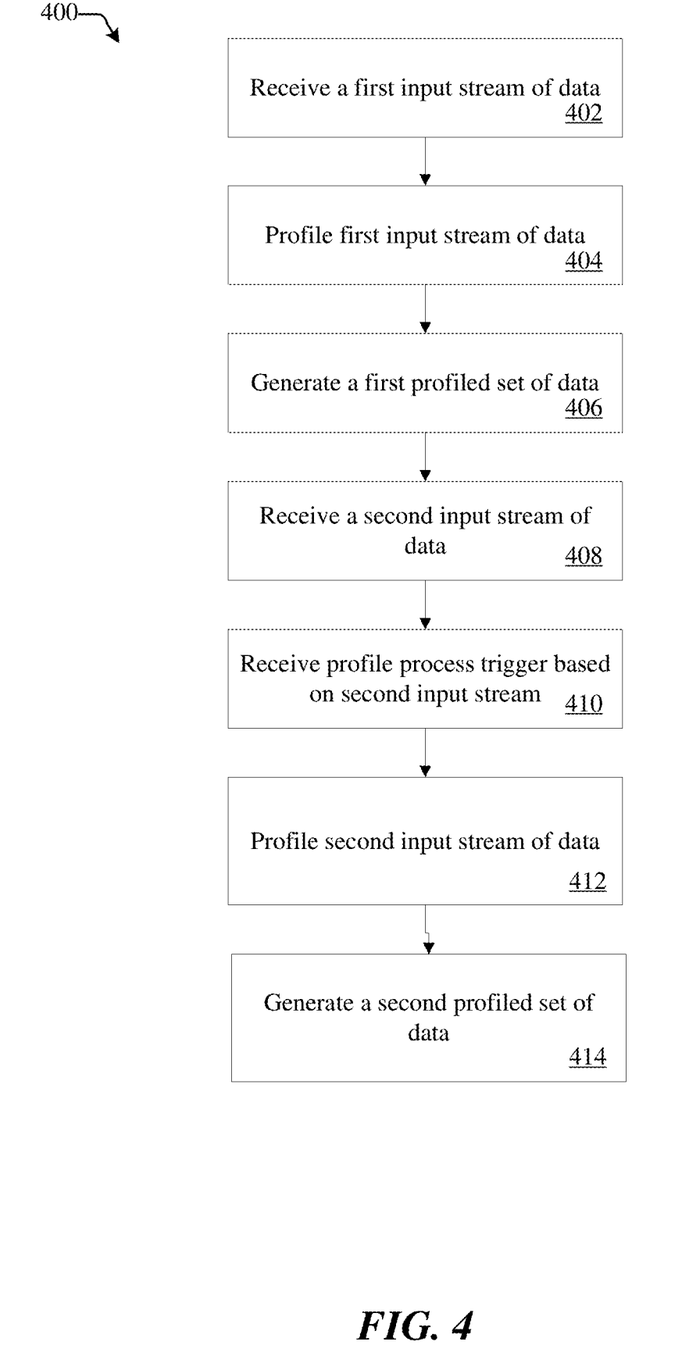
FIG. 4 illustrates an example method for continuous data profiling, as described herein.

FIG. 4 illustrates an example method for continuous data profiling, as described herein. Method 400 begins with receiving a first input stream of data 402. The streams of data may come from any number of client-owned data sources, such as those described in FIG. 3. The stream of data corresponding to the client may include one or more columns of client data.

Once the first input stream of data is received at step 402, the first input stream may be profiled at step 404, where at least one attribute from the stream of data may be identified. Further steps of the data profiling process may include retrieving a set of validation rules and a set of standardization rules that correspond to the attribute. The set of validation rules can provide rules indicative of whether the attribute corresponds to the attribute. The set of standardization rules may provide rules to modify the attribute into the standardized format.

The data profiling process step 404 may include comparing the attribute with the set of validation rules to determine whether the attribute corresponds to the attribute. If it is determined that the attribute corresponds to the attribute, the attribute can be modified, as described herein. In some embodiments, validating the attribute can include determining whether the attribute includes a null value that is identified in the set of validation rules. The attribute can be validated responsive to determining that the attribute does not include the null value.

The data profiling process may include modifying the attribute into a standardized format according to the set of standardization rules. This may be performed responsive to determining that the attribute is validated via the validation rules.

The data profiling process step 404 may include processing the attribute through multiple rules engines. The rules engines may include a name engine that associates the attribute with commonly associated names included in a listing of associated names, responsive to determining that the attribute is indicative of a name. The rules engines may also include an address library engine that adds the attribute to a library of addresses associated with the client, responsive to determining that the attribute is indicative of an address.

In some embodiments, processing the modified attribute through the set rules engines at step 404 can include, responsive to determining that the attribute is indicative of a name, processing the modified attribute through a name engine that associates the attribute with associated names included in a listing of associated names. Processing the modified attribute through the set rules engines can also include, responsive to determining that the attribute is indicative of an address, processing the modified attribute through an address library engine that adds the attribute to a library of addresses associated with the data subject.

In some embodiments, the method 400 at data profiling step 404 can include comparing a number of instances of the attribute relative to other attributes in the stream of data. A usage rank can be generated for the attribute. The usage rank can be based on the number of instances of the attribute in the stream of data, and the usage rank may be indicative of a number of insights that are capable of being derived from the attribute.

In some embodiments, a series of features can be identified that are associated with the attribute and identified relative to other attributes in the stream of data. Example features of the series of features can include a quality feature, availability feature, cardinality feature, etc. A value score can be derived for the attribute based on an aggregation of the series of features.

In some embodiments, at step 404, deriving the value score for the attribute based on the aggregation of the series of features can include processing the attribute to derive a quality feature of the attribute, the quality feature identifies a number of differences between the attribute as identified in the stream of data and the modified attribute modified according to the set of standardization rules. Deriving the value score for the attribute based on the aggregation of the series of features can also include processing the attribute to derive an availability feature of the attribute, the availability feature indicative of a number of null entries in a portion of data in the stream of data that corresponds to the attribute. Deriving the value score for the attribute based on the aggregation of the series of features can also include processing the attribute to derive a cardinality feature of the attribute, the cardinality feature indicative of a difference of the attribute relative to other attributes in the stream of data. Deriving the value score for the attribute based on the aggregation of the series of features can also include aggregating the derived quality feature, availability feature, and cardinality feature of the attribute to generate the value score for the attribute.

Once the first input stream of data is profiled at step 404, a first profiled set of data may be generated at step 406. At step 406, the profiled data may be constructed into a statistical table and displayed via a CDP manager. The system described herein may also maintain profiled insights/ranks/scores on a series of processed and profiled attributes, which allow data quality insights to be derived from the original input stream of data.

Once a first profiled set of data is generated at step 406, the system may receive a second input stream of data at step 408. In some examples, the second input stream of data may trigger a profiling process at step 410. The trigger may be based on a timing factor (e.g., profile a new input stream of data every 24 hours) or on a size factor (e.g., once the new input stream of data reaches 1 GB in size, process the new input stream of data). In other examples, the second input stream of data at step 408 may be stored in a client database until the profiling process is triggered in step 410. As such, the new data that is received by a client data store between the generation of the first profiled set of data and the triggering of a subsequent profiling process can be defined as the "second input stream of data."

Once the profiling process is triggered again at step 410, the second input stream of data is profiled at step 412 in accordance with the profiling steps and processing described above with respect to the profiling step 404.

Similarly, once the second input stream of data is profiled at step 412, a second profiled set of data is generated at step 414, wherein new statistical tables and data quality insights may be derived from the input data.

This process may continue to repeat as long as the profiling processing step is triggered as new input streams of data are received by client data stores, which are connected to a CDP manager. The CDP manager may monitor the inflow of data to client data store(s), and once a profiling trigger is initiated, the new inflow of data may be profiled in the client database.

Figure 5:
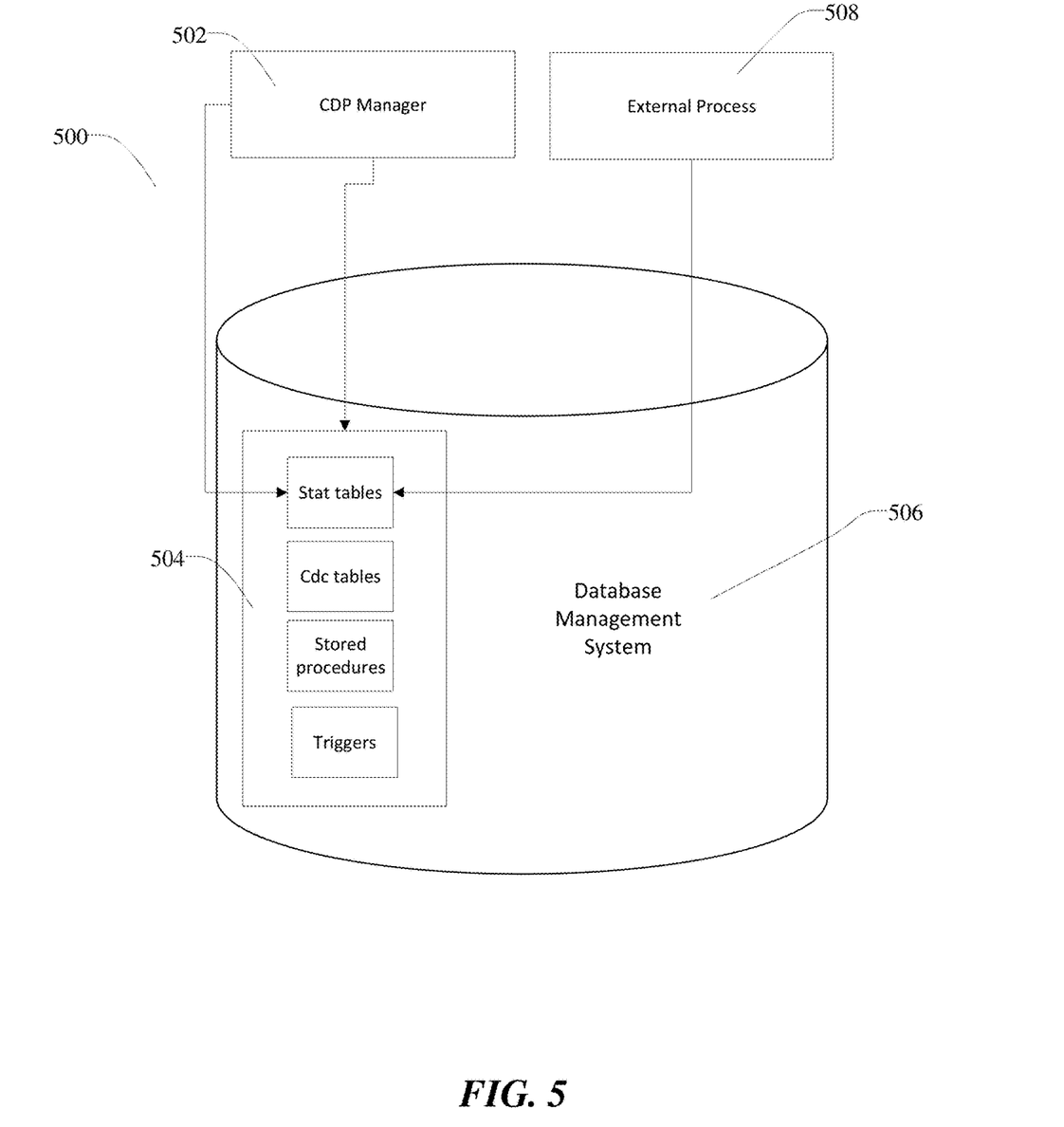
FIG. 5 illustrates an example architecture of a continuous data profiling manager and database management system.

FIG. 5 illustrates an example architecture of a continuous data profiling manager and database management system. Example architecture 500 includes a CDP manager 502, which is a lightweight user-interface software application that provides communications between the underlying client database and CDP tools. In some examples, the CDP Manager 502 may administer the CDP API and provide access (or revoke access) to the CDP API. The CDP manager 502 may be communicatively coupled to the database management system 506. The CDP manager 502 may install certain profiling tools from a CDP toolkit on the database management system 506, such as the ability for the DMS 506 to generate and store statistical tables, CDC tables, profiling procedures, and profiling triggers. The CDP manager 502 may also provide tools to the DMS 506 for configuration of certain stored procedures and profiling triggers. For instance, the CDP manager 502 may allow a user to configure which profiling triggers are set for automatic data profiling, such as temporal or size-based triggers, as described previously.

In some cases, the CDP manager plays a limited role, where the Data Warehouse is a public cloud hosted or manager (like Snowflake, BigQuery, Redshift, etc). The schedule and trigger may be provided by a Cloud Service native to the service provider but external to the database itself. In another example, an Amazon web services (AWS) event bridge handles scheduling and triggering of profiling execution within Redshift (e.g., Redshift is database of AWS).

Architecture 500 also includes external processes 508, which may be implicated if the DMS 506 is configured to use external processes 508. For example, once data is profiled and stored in a client database, the DMS 506 may transmit the stored profiled data to external processes via an API 508 that may further analyze the profiled data. in other examples, external process 508 may comprise a data marketplace where a client may wish to enhance and/or buy/sell certain data assets related to a profiled dataset stored on a client database.

Figure 6:
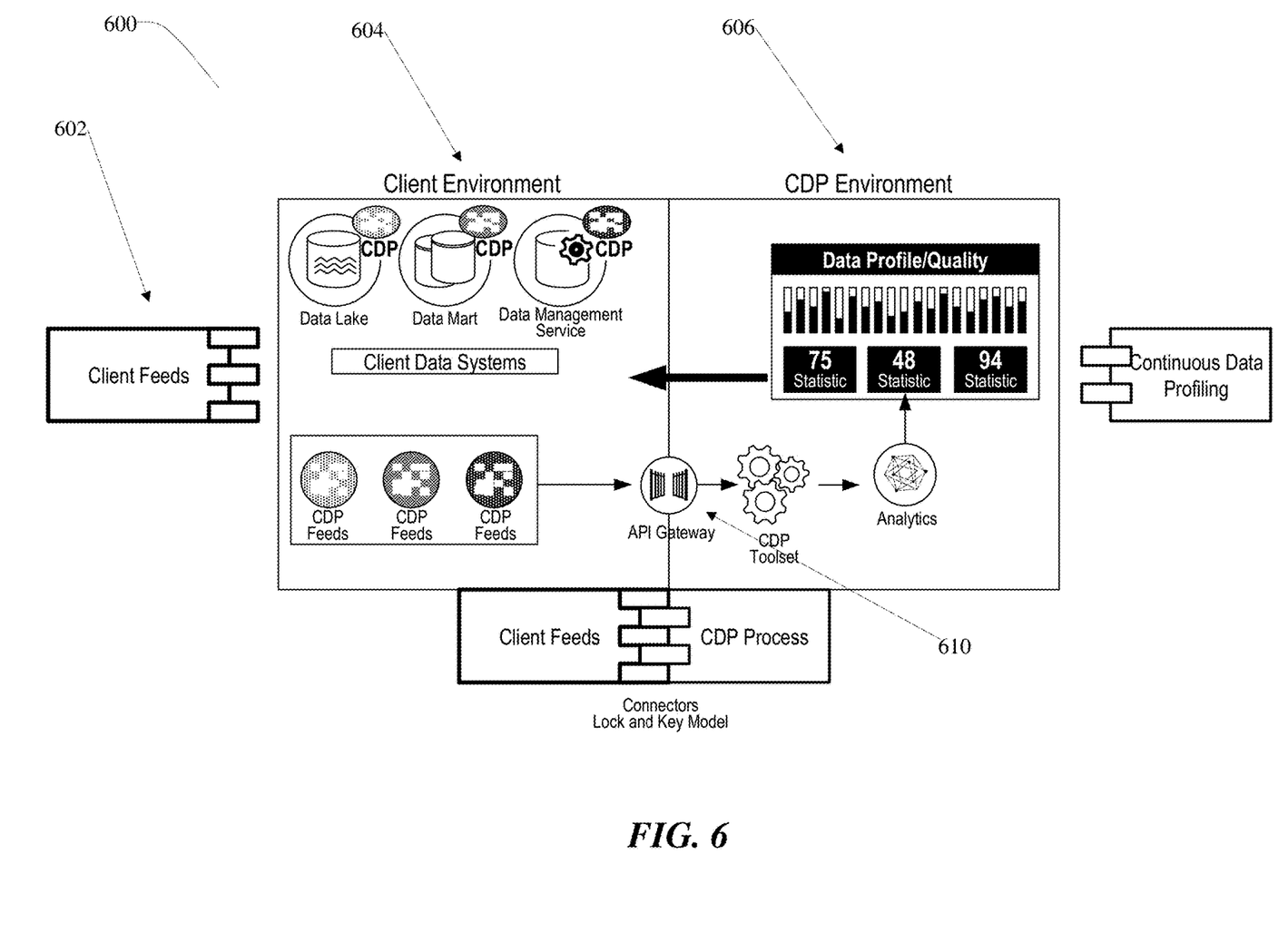
FIG. 6 illustrates an example environment for continuous data profiling.

FIG. 6 illustrates an example environment for connecting continuous data profiling to an external application via API for analysis/insights. Environment 600 is comprised of client feeds 602, which include data streams from a variety of data sources, such as those data sources described in FIG. 3 (e.g., data lakes, databases, flat files, and data streams). Each of the data sources has its own CDP environment where the profiling statistics are stored on a continuous basis. The CDP feeds are readable via an API gateway to do rapid analysis and provide insights without excessive processing time delay. The API gateway can be provided by any third party with data profiling or data quality capabilities.

The API gateway 610 is a continuous data profiling (CDP) gateway, managed by a CDP manager. The CDP manager may be a top-level, lightweight software interface that may be communicatively coupled to the client environment 604. The CDP manager may derive its functionality from a CDP environment, where certain data profiling and data quality analysis tools reside. Certain CDP toolkits may be available for use on a client dataset via the CDP API 610. The client CDP data feeds and the API gateway work as a lock and key mechanism, that client's can use to avail profiling insights on their data from a third party. Once the connection is established, the CDP API may install tools within the client environment 604 and/or provide for access to certain CDP tools via the CDP API that may be utilized (e.g., via cloud servers) to profile data stored within the client environment 604. It is important to note that the client data (e.g., CDP feeds) is not transmitted outside of the client environment 604 to, e.g., the CDP environment 606.

Figure 7:
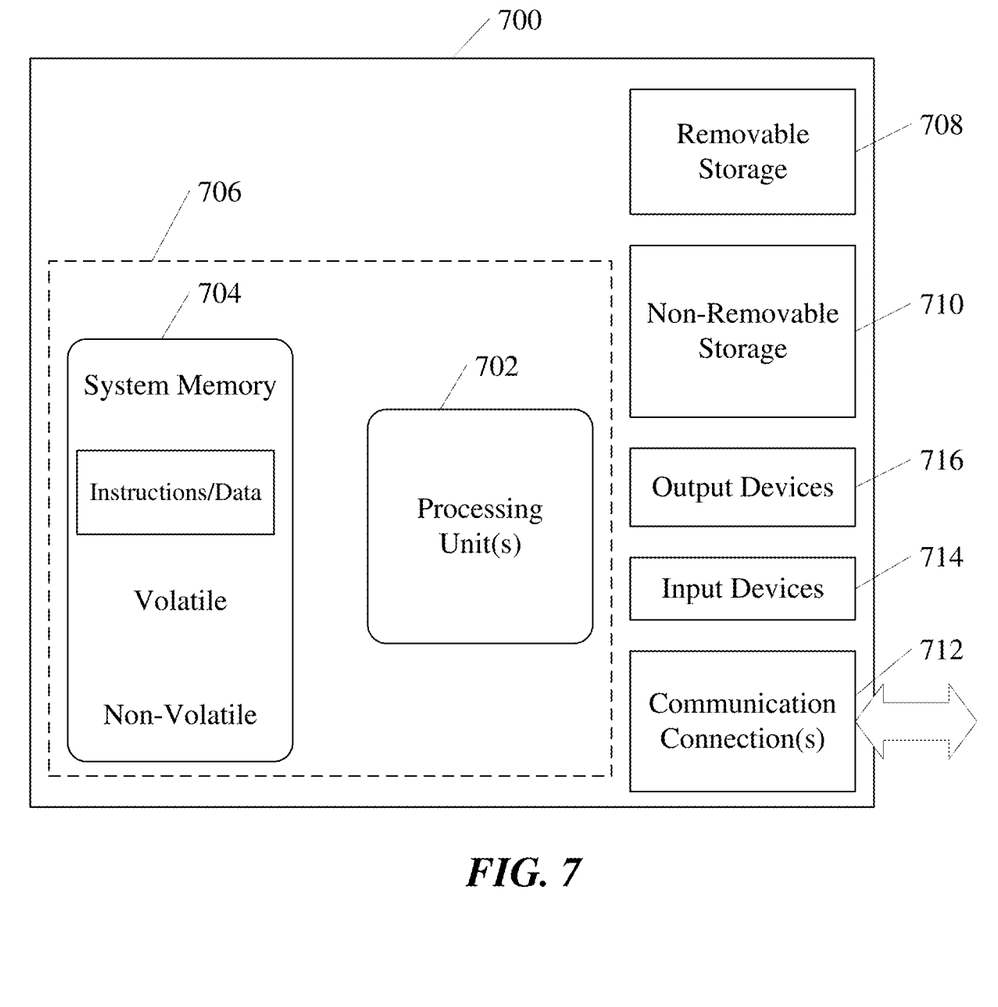
FIG. 7 illustrates one example of a suitable operating environment in which one or more of the present embodiments may be implemented.

FIG. 7 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device(s) 716 such as a display, speakers, printer, etc. Also included in the environment may be one or more communication connections, 712, such as LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method of continuously profiling data, the method comprising:
    receiving at least one input stream of data;
    profiling the at least one input stream of data by,
        identifying at least one attribute in the at least one input stream of data, wherein the at least one attribute is associated with a series of features,
        determining a profiling score for the at least one attribute based on a source of the at least one input stream of data and an aggregation of the series of features,
        determining the at least one attribute is indicative of an address, and
        in response to determining the at least one attribute is indicative of the address, processing the at least one attribute through an address library engine that adds the at least one attribute to a library of addresses;
    generating a profiled set of data based on the profiling of the at least one input stream of data, wherein the profiled set of data includes the profiling score for the at least one attribute; and
    storing the profiled set of data in at least one client database.

2. The method of claim 1, further comprising:
    retrieving at least one set of profiling rules and at least one set of processing rules that correspond to the at least one attribute;
    comparing the at least one attribute with the at least one set of profiling rules and the at least one set of processing rules to validate information included in the at least one attribute;
    in response to determining that the information included in the at least one attribute is profiled according to the at least one set of processing rules, storing the information for the at least one attribute into at least one profiled format according to the at least one set of processing rules, wherein the information is provisioned via at least one API gateway; and
    processing the at least one attribute through at least one set of rules engines.

3. The method of claim 1, further comprising:
    in response to determining that the at least one attribute is indicative of a name, processing the at least one attribute through a name engine that associates the at least one attribute with associated names included in a listing of associated names.

4. The method of claim 1, further comprising:
    receiving at least one set of continuous data profiling tools from a continuous data profiling manager, wherein the continuous data profiling manager is a frontend software application communicatively coupled to the at least one client database.

5. The method of claim 1, further comprising:
connecting at least one continuous data profiling (CDP) manager application to the at least one client database; and
receiving at least one instruction or at least one function via the at least one continuous data profiling (CDP) manager application.

6. The method of claim 5,
wherein the at least one function is a first function for generating a statistical table of profiled data,
wherein the at least one function is a second function for generating a change-data-store table of profiled data,
wherein the at least one function is a third function for managing at least one profiling process, and
wherein the at least one function is a fourth function for managing at least one profile trigger that is compared to the at least one input stream of data.

7. A system comprising:
one or more processors; and
one or more memories storing instructions that, when executed by the one or more processors, cause the system to perform a process for continuously profiling data, the process comprising:
receiving at least one input stream of data;
profiling the at least one input stream of data by,
identifying at least one attribute in the at least one input stream of data, wherein the at least one attribute is associated with a series of features,
determining a profiling score for the at least one attribute based on a source of the at least one input stream of data and an aggregation of the series of features,
determining the at least one attribute is indicative of an address, and
in response to determining the at least one attribute is indicative of the address, processing the at least one attribute through an address library engine that adds the at least one attribute to a library of addresses;
generating a profiled set of data based on the profiling of the at least one input stream of data, wherein the profiled set of data includes the profiling score for the at least one attribute; and
storing the profiled set of data in at least one client database.

8. The system according to claim 7, wherein the process further comprises:
retrieving at least one set of profiling rules and at least one set of processing rules that correspond to the at least one attribute;
comparing the at least one attribute with the at least one set of profiling rules and the at least one set of processing rules to validate information included in the at least one attribute;
in response to determining that the information included in the at least one attribute is profiled according to the at least one set of processing rules, storing the information for the at least one attribute into at least one profiled format according to the at least one set of processing rules, wherein the information is provisioned via at least one API gateway; and
processing the at least one attribute through at least one set of rules engines.

9. The system according to claim 7, wherein the process further comprises:
in response to determining that the at least one attribute is indicative of a name, processing the at least one attribute through a name engine that associates the at least one attribute with associated names included in a listing of associated names.

10. The system according to claim 8, wherein the process further comprises:
receiving at least one set of continuous data profiling tools from a continuous data profiling manager, wherein the continuous data profiling manager is a frontend software application communicatively coupled to the at least one client database.

11. The system according to claim 7, wherein the process further comprises:
connecting at least one continuous data profiling (CDP) manager application to the at least one client database; and
receiving at least one instruction or at least one function via the at least one continuous data profiling (CDP) manager application.

12. The system according to claim 11,
wherein the at least one function is a first function for generating a statistical table of profiled data,
wherein the at least one function is a second function for generating a change-data-store table of profiled data,
wherein the at least one function is a third function for managing at least one profiling process, and
wherein the at least one function is a fourth function for managing at least one profile trigger that is compared to the at least one input stream of data.

13. A non-transitory computer-readable medium storing instructions that, when executed by a computing system, cause the computing system to perform operations for continuously profiling data, the operations comprising:
receiving at least one input stream of data;
profiling the at least one input stream of data by,
identifying at least one attribute in the at least one input stream of data, wherein the at least one attribute is associated with a series of features,
determining a profiling score for the at least one attribute based on a source of the at least one input stream of data and an aggregation of the series of features,
determining the at least one attribute is indicative of an address, and
in response to determining the at least one attribute is indicative of the address, processing the at least one attribute through an address library engine that adds the at least one attribute to a library of addresses;
generating a profiled set of data based on the profiling of the at least one input stream of data, wherein the profiled set of data includes the profiling score for the at least one attribute; and
storing the profiled set of data in at least one client database.

14. The non-transitory computer-readable medium of claim 13, wherein the operations further comprise:
retrieving at least one set of profiling rules and at least one set of processing rules that correspond to the at least one attribute;
comparing the at least one attribute with the at least one set of profiling rules and the at least one set of processing rules to validate information included in the at least one attribute;

in response to determining that the information included in the at least one attribute is profiled according to the at least one set of processing rules, storing the information for the at least one attribute into at least one profiled format according to the at least one set of processing rules, wherein the information is provisioned via at least one API gateway; and processing the at least one attribute through at least one set of rules engines.

15. The non-transitory computer-readable medium of claim 13, wherein the operations further comprise:

in response to determining that the at least one attribute is indicative of a name, processing the at least one attribute through a name engine that associates the at least one attribute with associated names included in a listing of associated names.

16. The non-transitory computer-readable medium of claim 13, wherein the operations further comprise:

receiving at least one set of continuous data profiling tools from a continuous data profiling manager, wherein the continuous data profiling manager is a frontend software application communicatively coupled to the at least one client database.

17. The non-transitory computer-readable medium of claim 13, wherein the operations further comprise:

connecting at least one continuous data profiling (CDP) manager application to the at least one client database; and receiving at least one instruction or at least one function via the at least one continuous data profiling (CDP) manager application, wherein the at least one function is a first function for generating a statistical table of profiled data, wherein the at least one function is a second function for generating a change-data-store table of profiled data, wherein the at least one function is a third function for managing at least one profiling process, and wherein the at least one function is a fourth function for managing at least one profile trigger that is compared to the at least one input stream of data.

* * * * *